United States Patent Office 3,669,544
Patented June 13, 1972

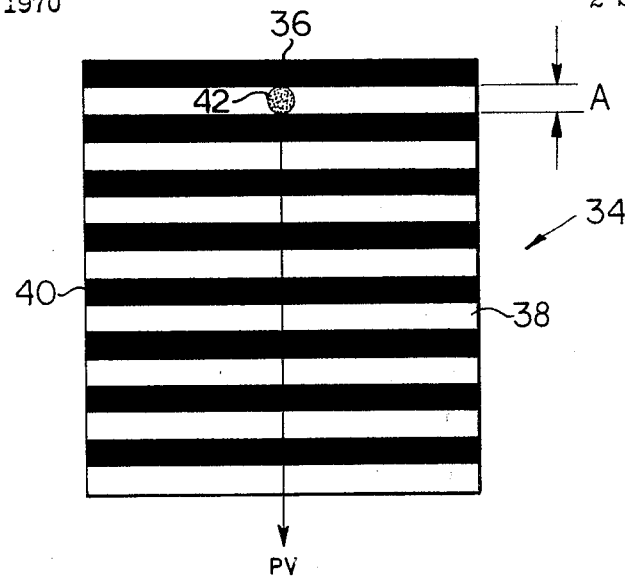
FIG.2
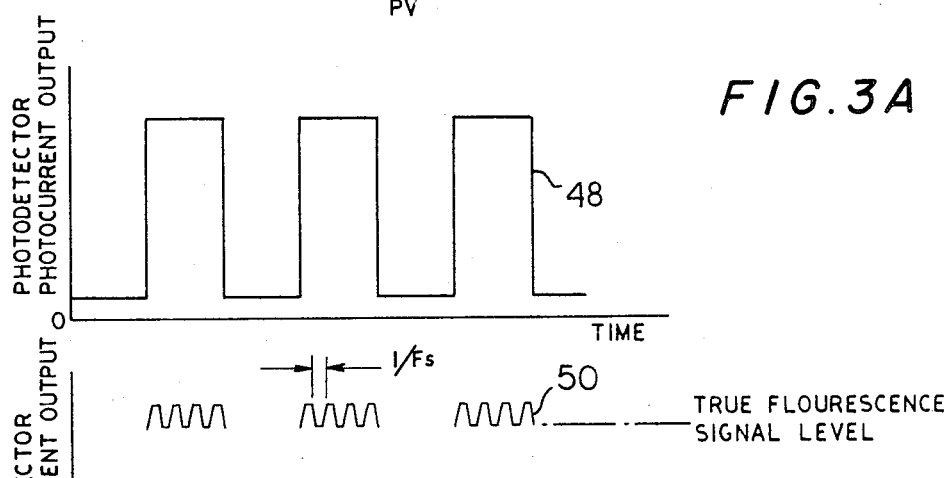
FIG.3A
FIG.3B
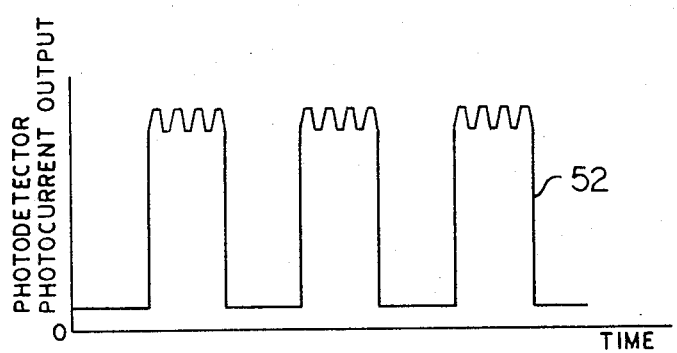
FIG.3C

3,669,544
APPARATUS FOR THE ELIMINATION AND/OR DETECTION OF SCATTER SIGNALS IN ATOMIC FLUORESCENCE SPECTROSCOPY ANALYSIS MEANS
Zindel H. Heller, Plainview, N.Y., assignor to Technicon Instruments Corporation, Tarrytown, N.Y.
Filed Oct. 30, 1970, Ser. No. 85,540
Int. Cl. G01n 21/52, 21/54
U.S. Cl. 356—85
6 Claims

ABSTRACT OF THE DISCLOSURE

New and improved apparatus for eliminating and/or detecting scatter signals from the radiation scattered by scattering particles in the sample flame of atomic fluorescence spectroscopy analysis means are provided, and comprise means to convert the scattered radiation to relatively high frequency scatter signals which occupy a higher frequency region of the output signal frequency spectrum than that occupied by the atomic fluorescence analysis output signal, and means to separate said scatter signals from said output signal to eliminate the former from the latter and/or to enable detection of said scatter signals.

BACKGROUND OF THE INVENTION

(1) Field of the invention

This invention relates to new and improved apparatus for eliminating scatter signals from the signal output of atomic fluorescence spectroscopy apparatus and/or for detecting such signals to thus indicate the presence of radiation scattering particles in the sample flame.

(2) Description of the prior art

Although apparatus are available for detecting scatter signals from radiation scattering particles in atomic fluorescence spectroscopy apparatus, it may be understood that the same are, in general, unduly complex and costly, require the performance of one or more time consuming and tedious separate steps for the utilization thereof and are not, in any event, quantitative. Thus, for example, one prevalent form of such prior art apparatus may be understood to require a separate flame irradiation source and the irradiation thereby of the sample flame at a non-analysis wavelength to simply determine whether or not radiation scattering is being effected by scattering particles in said sample flame.

Further, no prior art apparatus are known which function to eliminate scatter signals from the signal output of atomic fluorescence spectroscopy analysis means.

OBJECTS OF THE INVENTION

It is, accordingly, an object of this invention to provide new and improved apparatus for eliminating scatter signals from the signal output of atomic fluorescence spectroscopy apparatus.

Another object of this invention is the provision of new and improved apparatus for detecting scatter signals as caused by radiation scattering particles in the sample flame of atomic fluorescence spectroscopy apparatus.

Another object of this invention is the provision of apparatus as above which are of relatively simple and inexpensive design, construction, and manner of operation.

Another object of this invention is the provision of apparatus as above which can function to provide a quantitative determination of the magnitude of the scatter signals.

A further object of this invention is the provision of apparatus as above which require the use of only readily available components of proven dependability in the fabrication thereof to thus provide for long periods of satisfactory, maintenance-free apparatus operation.

A still further object of the invention is the provision of apparatus as above which are particularly adaptable for use in conjunction with analysis means taking the form of those shown and described in the copending application for U.S. patent of Lee M. Lieberman and Robert T. Schumann entitled "New and Improved Optical System for Use in Automatic, Simultaneous Multielement Atomic Spectroscopy Apparatus," S.N. 59,401, filed July 30, 1970. and assigned to the assignee hereof.

SUMMARY OF THE INVENTION

As disclosed herein, the new and improved apparatus of the invention for eliminating and/or detecting scatter signals from the radiation scattered by scattering particles in the sample flame of atomic fluorescence spectroscopy sample analysis means comprise scattered radiation conversion means taking the form of a reticule which is operatively disposed adjacent the photosensitive surface of the analysis means photodetector. In operation, the scattered radiation is swept across said reticule as a result of the upward movement of the scattering particles in the sample flame, and the imaging system of the analysis means, with resultant generation of relatively high frequency scatter signals which occupy a higher region of the output signal frequency spectrum than the atomic fluorescence analysis output signal. Signal separating means taking the form of electrical filter means, or DC amplifier means with appropriate frequency response, are provided to separate the signals and eliminate the scatter signals from said output signal. For scatter signal detection, other electrical filter means are provided which will pass only the scatter signals, and scatter signal detector means are operatively associated therewith to provide indicia of the presence of radiation scattering particles in the sample flame. In one disclosed form of the invention, means are included to enable the periodic operative positioning of the reticule relative to the photodetector means.

DESCRIPTION OF THE DRAWINGS

The above and other objects and advantages of this invention are believed made clear by the following detailed description thereof taken in conjunction with the accompanying drawings wherein:

FIG. 2 is a diagrammatic illustration of a reticule for use in the apparatus of the invention;

FIGS. 3A, 3B and 3C are graphs drawn to the same scale of output signal waveforms which are operated on by the apparatus of the invention; and FIG. 4 is a schematic illustration of reticule positioning means for use in a second form of the apparatus of the invention.

DETAILED DESCRIPTION OF THE INVENTION

Figure 1:
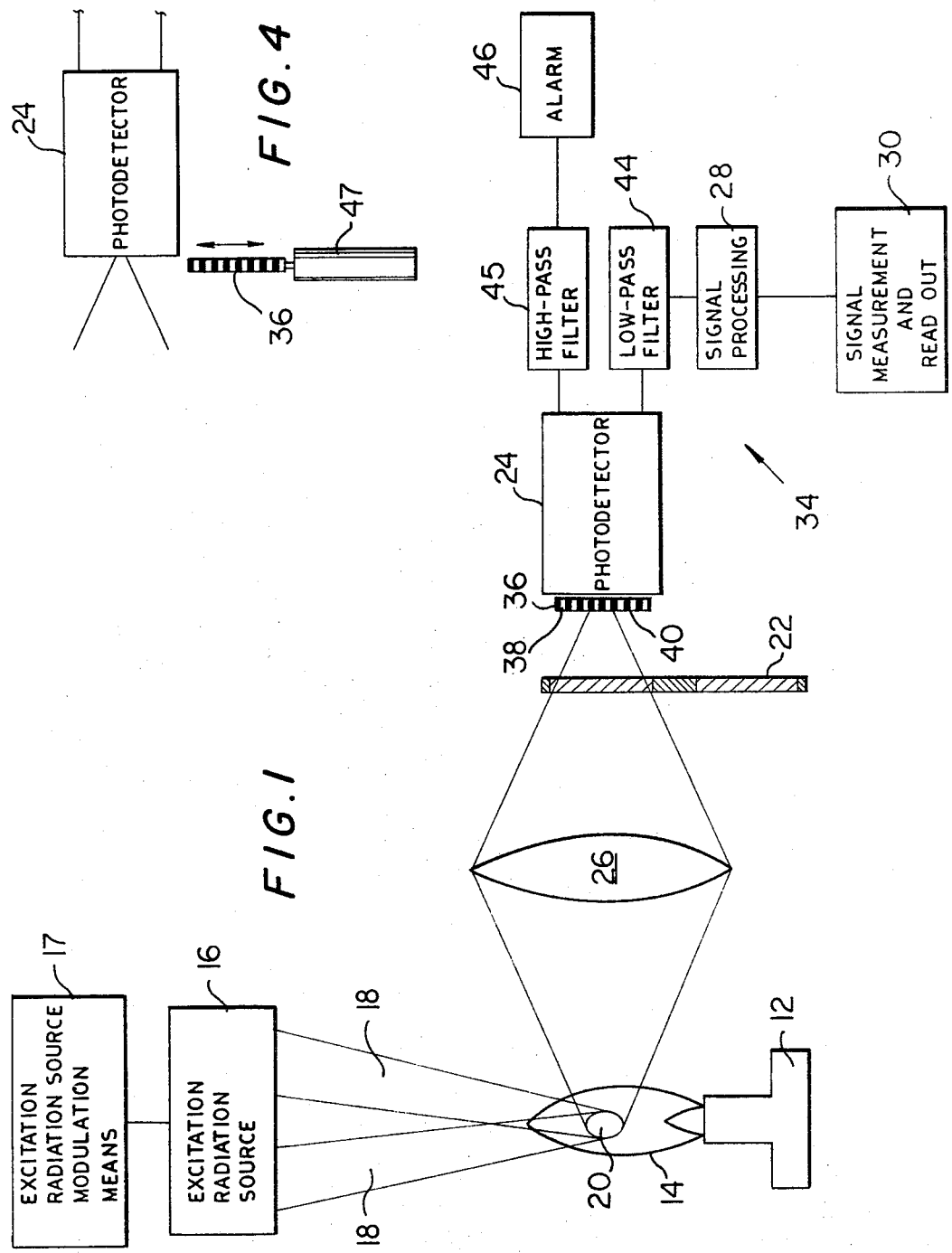
FIG. 1 is a schematic diagram of the apparatus of the invention operatively associated with atomic fluorescence spectroscopy sample analysis means.

Referring now to FIG. 1, atomic fluorescence spectroscopy sample analysis means which may, for example, take the form of those shown and described in the copending application for U.S. patent of Lee M. Lieberman and Robert T. Schumann entitled "New And Improved Optical System for Use in Automatic Simultaneous Multielement Atomic Spectroscopy Sample Analysis Apparatus," Ser. No. 59,401, filed July 30, 1970, and assigned to the assignee hereof, are indicated generally at 10 and comprise a sample burner 12 which is effective to provide a sample flame 14, a modulated source of flame excitation radiation 16 which is effective to provide modulated beams 18 of excitation radiation of appropriate wavelengths for focussing substantially at a sample volume 20 in the flame 14, multiple optical filter means 22 of appropriate bandpasses, photodetector means 24, atomic fluorescence radiation collecting optics 26 which are effective to collect the atomic fluorescence radiations of interest from the sample volume 20 and faithfully image the same as indicated on the active surface of the photodetector means 24, photodetector means output signal processing means 28, and output signal measurement and read-out means 30, respectively. In operation, as briefly described, it may be understood that a solution of a sample having a plurality of metallic constituents of interest is fed, for quantitative constituent determination, through sample burner 12 to sample flame 14 to effect partial conversion of the metallic constituents of interest to atoms in the sample volume 20. The concomitant, sequential irradiation of said sample volume by the modulated beams 18 of excitation radiation will be effective to cause sequential fluorescence of the atoms of said sample constituents of interest. The resultant atomic fluorescence radiations of interest are collected as indicated by the collecting optics 26 and imaged thereby through optical filter means 22 for impingement as indicated upon the photosensitive surface of the photodetector 24 with resultant provision of an output signal train for amplification, gating and demodulation in the signal processing means 28, and subsequent measurement and read-out in the signal read-out means 30.

A particular problem in the operation of the atomic fluorescence spectroscopy sample analysis means 10 arises from reflection or scattering of the excitation radiation by solid and/or liquid particles in the sample volume 20 with resultant generation of interference or scatter signals by the photodetector 24 and attendant confusion as to whether or not the photodetector output signal is representative of the true atomic fluorescence signal of interest, or alternatively, of the latter plus said interference or scatter signals to thereby cast doubt upon the validity of the analysis results.

More specifically, and considering for example an application wherein the analysis means 10 are being utilized to quantitatively analyze a sample solution for a number of metallic constituents which include aluminum and titanium through the use of excitation radiation sources including aluminum and titanium hollow cathode lamps, and an extremely hot nitrous oxide sample flame 14, it may be understood that if $AlSO_4$ is present in the sample matrix, the same may combine with oxygen to form $Al_2O_2$ particles with resultant reflection or scattering thereby of, for example, the titanium excitation radiation as said particles travel with the flame gases through the sample volume 20, and attendant provision of a false titanium fluorescence output signal by the photodetector 24. Too, any liquid droplets of the sample solution which do not completely vaporize in the sample flame 14 will be similarly effective to scatter the excitation radiation attendant the travel thereof with the flame gases through the sample volume 20.

Means constructed and operative in accordance with the teachings of this invention to eliminate and/or detect the scatter signals from radiation scattering particles in the flame are indicated generally at 34 in FIGS. 1 and 2 and comprise transducer means taking the form of a reticule 36 which is operative to convert the scattered radiation to scatter signals which occupy a different region of the overall photodetector output signal frequency spectrum than that occupied by the fluorescence output signal. The reticule 36 is disposed as shown substantially at the image of the flame sample volume 20 on the active surface of the photodetector means 24, and comprises a substrate upon which is engraved or otherwise fabricated alternating, substantially transparent and substantially opaque areas or parallel rulings 38 and 40 of substantially equal width, respectively. Such reticules are commonly known to those skilled in this art as "Ronchi-rulings." For use as described in detail hereinbelow in conjunction with atomic fluorescence spectroscopy analysis means, the reticule substrate is preferably made of quartz, sapphire or other ultra-violet transmitting material.

The reticule 36 is oriented as indicated relative to the image of the flame volume 20 so that the parallel rulings 38 and 40 are substantially orthogonal to the axis of motion of the flame gases in the flame 14.

The projected image of a scattering particle of average size from the sample volume 20 is indicated at 42 on the surface of the reticule 36 in FIG. 2, and it may readily be seen that the width of the rulings 38 and 40 is made substantially the same as the diameter A of said projected particle image. If the collecting optics 26 are assumed to to effective to reverse the flame volume 20 for imaging on the photodetector means 28, it may be understood that upward travel of the flame gases and scattering particles in the flame 14 will, of course, result in downward travel of the image 42 of a said scattering particle across the reticule.

Further included in the scatter signal elimination and/or detecting means 34 are low-pass electrical filter means 44 which are operatively connected as indicated intermediate the photo-detector means output and the input of the read-out means 28. High-pass filter means are indicated at 45 and are also operatively connected as indicated to the output of the photo-detector means 28, and are operatively connected to the input of suitable audible and/or visible alarm means as indicated at 46.

In operation, with the sample volume 20 irradiated as described by a modulated beam 18 of excitation radiation, it may be understood that the photocurrent output from the photo-detector means 28 which results from the impingement thereon of the atomic fluorescence radiation of interest may, for example, take the form of the excitation waveform 48 of FIG. 3A which waveform is indicative of the true fluorescence signal of interest plus flame background radiation, random noise, photodetector dark current and the like. Since the fluorescence of a sample element atom is a substantially instantaneous phenomenon, it may be understood that the rulings 40 of the reticule 36 will have substantially no effect upon this true fluorescence signal except, of course, to reduce the intensity thereof by substantially one half.

If a scattering particle is assumed to be present in the flame 14 and to concomitantly traverse the sample volume 20, it may be understood that the particle image 42 will traverse the reticulate 36 substantially from top to bottom as described to produce the scatter signal as indicated by the waveform 50 in FIG. 3B. More specifically, it may be understood that when the particle image 42 is traversing an opaque ruling 40, the scatter signal will be substantially non-existent. Conversely, when said image is traversing a transparent ruling 38, said scatter signal will be at its maximum. When the particle image 42 is in transition between a transparent and opaque reticule ruling, the magnitude of the scatter signal will, of course, vary, to result in the depicted, generally trapezoidal portions of the waveform 50.

The concomitant impingement as described of the true fluorescence radiation and the scattering particle image 42 on the active surface of the photodetector 28 will, of course, result in the photocurrent output thereof taking the form of the composite waveform 52 of FIG. 3C.

The fundamental frequency Fs of the scatter signal 50 will, of course, be substantially higher than the frequency at which the beams 18 of excitation radiation are modulated, and may be determined by the following equation:

$$Fs = \frac{PV}{2PA}$$

wherein P is equal to the magnifying power of the collecting optics 22, A is the average diameter of a particle image 42, V is the velocity of a scattering particle in the flame, and PV is the velocity of a particle image 42 across the reticle 36, respectively. For a typical application it may be understood that Fs might, for example, equal approximately 5.0 mHz., while the excitation radiation modulation frequency might, for example, equal 500 Hz.

Since, as described, Fs is much greater than the excitation radiation modulation frequency, the operative interposition as described of a low pass electrical filter 44 having a passband which extends above the excitation radiation modulation frequency, but terminates well below the scatter signal frequency Fs, and the application as described of the output of the photodetector means 24 thereto as indicated by the waveform 52 of FIG. 3C, will effectively prevent the passage of any portion of the scatter signal waveform 50 of FIG. 3B to the signal processing, measurement and read-out means 28 and 30. As a result, substantially only the true fluorescence signal as indicated by the waveform 48 of FIG. 3A will be passed for processing, measurement and read-out, to thus effectively eliminate the effects of excitation radiation scattering and the like and prevent the read-out of a false fluorescence signal.

The concomitant application as described of said photodetector means output signal to the high-pass electrical filter 45 having a passband which includes and extends below and above the scatter signal frequency Fs but terminates well above the excitation radiation modulation frequency, will result in the passage of substantially only the scatter signal as indicated by the waveform 50 to the alarm means 46 to actuate the same and provide audible and/or visible indicia of the presence of a not insignificant scatter signal component in the photodetector means output signal.

For use in those applications wherein the overall magnitude of the radiation which impinges upon the photodetector means 24 is too small as to enable a 50% reduction in signal radiation power, the reticule 36 may be mounted on reticule positioning means as indicated at 47 in FIG. 4, which may, for example, take the form of a solenoid-operated device or the like, and are effective to operatively position said reticule as desired relative to the photodetector means 24. Accordingly, the periodic actuation of the reticule positioning means 47 will be effective to operatively position the reticule 36 as described to effect the actuation of alarm means 46 if a not insignificant scatter signal component is present in the photocurrent output signal. In addition, careful observation of the read-out means or the change in recorded results therefrom attendant the insertion of the reticule 36 into operative position will be effective to enable quantitative determination of the magnitude of the scatter signal component of interest.

Use of the apparatus of the invention without the high-pass filter 45 and alarm means 46 for the elimination, only, of the effects of radiation scattering is, of course, well within the scope of the invention, as is use of said apparatus without the low-pass filter 44 for the detection, only, of said radiation scattering.

Although depicted and described as a separate component, it may be understood that the function of the low-pass filter 44 may alternatively be performed by the DC amplifier means which are included in the signal processing means 28. More specifically, the frequency response of said amplifier means may be established, as through proper choice of the resistive and capacitive amplifier circuit components, to provide for a high frequency cut-off of the amplifier at a frequency well below the scatter signal frequency Fs. As a result, the scatter signal will not pass through the amplifier.

Although disclosed for purposes of illustration as applied to atomic fluorescence spectroscopy analysis means for simultaneous, multielement analysis, it is believed clear that the apparatus of the invention are equally applicable to single element analysis means.

While there have been shown and described preferred embodiments of the invention, it will be understood that the invention may be embodied otherwise than as herein specifically illustrated or described, and that in the illustrated embodiments certain changes in the details of construction and in the form and arrangement of the parts may be made without departing from the underlying idea and principles of this invention within the scope of the appended claims.

What is claimed is:

1. In apparatus for detecting scatter signals from the radiation scattered by scattering particles in the sample flame of atomic fluorescence spectroscopy analysis means which are operable to provide an atomic fluorescence analysis output signal, the improvements comprising, means to convert the scattered radiation to scatter signals which occupy a different region of the output signal frequency spectrum than that occupied by said atomic fluorescence analysis output signal, means to separate said scatter signals from said atomic fluorescence analysis output signal, and means to detect said separated scatter signals.

2. In apparatus as in claim 1 wherein, said atomic fluorescence spectroscopy analysis means comprise photodetector means for the generation of said atomic fluorescence analysis output signal and said scatter signals, and said scattered radiation conversion means comprise reticule means positioned with respect to said photodetector means and across which said scattered radiation is swept prior to the impingement thereof on said photodetector means for the generation of said scatter signals.

3. In apparatus as in claim 1 wherein, said signal separating means comprise electrical filter means which will pass said atomic fluorescence analysis output signal but will not pass said scatter signals whereby, the application of said atomic fluorescence analysis output signal and said scatter signals to said signal separating means will be effective to eliminate said scatter signals from said output signal.

4. In apparatus as in claim 1 wherein, said signal separating means comprise DC amplifier means having a frequency response which is such that said atomic fluorescence analysis output signal will be passed thereby while said scatter signals will not be passed by said DC amplifier means whereby, the application of said atomic fluorescence analysis output signal and said scatter signals to said DC amplifier means will be effective to eliminate said scatter signals from said output signal.

5. In apparatus as in claim 3 wherein, said signal separating means further comprise electrical filter means which will pass said scatter signals but will not pass said atomic fluorescence analysis output signal, and means responsive to said second-mentioned filter means to detect said scatter signals to thus indicate the presence of radiation scattering particles in the sample flame.

6. In apparatus as in claim 2 wherein, said reticule means are movable with respect to said photodetector means between a first position to generate said scatter signals and a second position displaced from said photodetector means and thus not operable to generate said scatter signals.

References Cited

UNITED STATES PATENTS 3,565,567   2/1971   Rains _____ 356—87

RONALD L. WIBERT, Primary Examiner

F. L. EVANS, Assistant Examiner

U.S. Cl. X.R.

250—71 R; 356—87, 97